United States Patent

Kawai et al.

[11] Patent Number: 5,882,172
[45] Date of Patent: Mar. 16, 1999

[54] PALLET TRANSFER APPARATUS

[75] Inventors: Sumio Kawai, Kasugai; Masayuki Kiriyama, Nagoya, both of Japan

[73] Assignee: Ohkuma Corporation, Aichi-ken, Japan

[21] Appl. No.: 978,115

[22] Filed: Nov. 26, 1997

[30] Foreign Application Priority Data

Nov. 29, 1996 [JP] Japan .................................. 8-320090

[51] Int. Cl.⁶ .................................................. B65G 65/08
[52] U.S. Cl. ........................ 414/749; 74/110; 198/476.1; 198/478.1
[58] Field of Search ................................ 414/749, 744.6; 74/110; 108/20, 137, 143; 198/478.1, 476.1, 474.1, 470.1, 346.1; 29/33 P

[56] References Cited

U.S. PATENT DOCUMENTS

| | | | |
|---|---|---|---|
| 3,892,324 | 7/1975 | Faletti, Jr. | 414/749 |
| 4,373,840 | 2/1983 | Miller, Jr. | 414/744.6 X |
| 5,275,064 | 1/1994 | Hobbs | 414/749 X |

FOREIGN PATENT DOCUMENTS

| | | |
|---|---|---|
| 62-4437 | 1/1987 | Japan . |
| 6-5072 | 2/1994 | Japan . |
| 7-25005 | 3/1995 | Japan . |

*Primary Examiner*—Donald W. Underwood
*Attorney, Agent, or Firm*—Lahive & Cockfield, LLP

[57] ABSTRACT

In a pallet transfer apparatus, a base is reciprocably supported in a frame so that a hydraulic cylinder provided in the frame can drive the base. A pair of large-diameter sprockets and a pair of small-diameter sprockets are disposed on the upper and lower sides, respectively, of the frame, with a first and second endless roller chains fitted over the pairs of sprockets. The first endless roller chain includes a securing member which fixes the chain to the frame. The second endless roller chain has engaging member projected upward therefrom. In addition, a slider having a block in the intermediate part thereof is slidably mounted on a rail above the base. The engaging member engages the block. Moreover, the slider is provided with a catch for disconnectably engaging a hook of pallet P. When the base is driven by the hydraulic cylinder, the front small-diameter sprocket and the front large-diameter sprocket are integrally rotated since the first endless roller chain is fixed to the frame. As the large-diameter sprocket is rotated, the second endless roller chain is rotated, the engaging member is reciprocably moved twice the stroke of the hydraulic cylinder between the outermost points of the circumferences of the large-diameter sprockets, thus transferring pallet P by means of the slider.

9 Claims, 6 Drawing Sheets

PALLET TRANSFER APPARATUS

BACKGROUND OF THE INVENTION

1. Field of the Invention

The present invention relates to an automatic pallet changer for use with a machine tool. More particularly, the present invention relates to a pallet transfer apparatus installed in an automatic pallet changer for use with a machine tool.

2. Description of the Related Art

Conventionally, various types of pallet transfer apparatus have been put to use, including:

(1) Those that use a hydraulic cylinder to directly transfer a pallet;

(2) Those provided with a motor to transfer a pallet via a ball screw connected to the motor; and (3) Those that include an engaging member attached to a section of a chain to transfer a pallet.

All of the above-described apparatuses have a common drawback which arises from the fact that the stroke of the drive means is the same as the transfer distance of the pallet. If a pallet is to be transferred over a long distance, a long hydraulic cylinder, ball screw, or chain must be employed, making the entire apparatus undesirably large. In the case of an apparatus employing a hydraulic cylinder or a ball screw, abrupt acceleration and deceleration occur at the start-up and termination of the transfer operation, thus exposing the pallet and the work placed thereon to excessive shock or vibration. The type of apparatus using a chain has an advantage over the other two types in that the engaging member can be smoothly accelerated and decelerated around the sprockets on which the chain is fit. The problem presented by this type of drive means is that the pallet transfer distance is limited to the addition of the distance between the sprocket axes of the sprockets to the pitch circle diameter of the sprockets. Japan Examined Utility Model Application No. 62-4437 discloses a pallet transfer apparatus in which each chain is fixed to a base to transfer the sprockets twice the distance of the cylinder stroke while maintaining the sprocket pitch. The disadvantage of this apparatus is that the transfer distance is limited to only twice the cylinder stroke.

SUMMARY OF THE INVENTION

In view of the above-identified problems, an object of the present invention is to provide an apparatus for smoothly and rapidly transferring a pallet by means of a small drive, thus minimizing the entire size of the apparatus.

Another object of the present invention is to provide an apparatus for smoothly and rapidly transferring a pallet by means of a transfer device with a long stroke.

The above objects and other related objects are realized by providing a pallet transfer apparatus which comprises: a frame having an upper surface; a base having upper and lower surfaces and reciprocably mounted on the frame; a drive means for reciprocably driving the base between a first position and a second position; first and second small-diameter sprockets rotatably mounted on the base; and first and second large-diameter sprockets rotatably mounted on the base. The first large-diameter sprocket and the first small-diameter sprocket are supported on a common axis so as to rotate integrally. The pallet transfer apparatus further comprises: a first chain fitted over the small-diameter sprockets, a portion of the first chain being fixed to the frame; a second chain fitted over the large-diameter sprockets; a first engaging member protruding from a portion of the second chain; a slider mounted on the base so as to reciprocate thereon; a second engaging member, provided in the slider, for engaging the first engaging member; and a catch, provided in the slider, for engaging a pallet. In this apparatus, when the base is driven by the drive means, the first engaging member is moved via the first large-diameter and first small-diameter sprockets and the second chain so as to move the slider, thereby transferring the pallet.

According to one aspect of the present invention, the large-diameter and small-diameter sprockets are arranged parallel to the axis of reciprocation of the base.

According to another aspect of the present invention, the first engaging member is configured to move along a predetermined route when the base is driven by the drive means. The predetermined route of the engaging member and the portion of the first chain fixed to the frame are located opposite each other across the line going through the rotational axes of the small-diameter sprockets and the large-diameter sprockets.

According to still another aspect of the present invention, the route has first and second terminals located at the two intersections of the line going through the rotational axes and the second chain.

According to yet another aspect of the present invention, the first engaging member is at the first terminal when the base is in the first position and at the second terminal when the base is in the second position.

In accordance with another aspect of the present invention, the small-diameter sprockets are mounted on the lower surface of the base and the large-diameter sprockets are mounted on the upper surface of the base.

In another preferred mode of the present invention, the drive means is a hydraulic cylinder mounted on the upper surface of the frame below the small-diameter sprockets.

In one practice, the sum of the pitch circle diameter of either large-diameter sprocket and the distance between the axes of the large-diameter sprockets is greater than the stroke of the hydraulic cylinder.

In another practice, the first engaging member is a roller and the second engaging member is a recess formed in an under surface of a block mounted on the slider.

BRIEF DESCRIPTION OF THE DRAWINGS

For a fuller understanding of the nature and objects of the present invention, reference should be made to the following detailed description and the accompanying drawings, in which.

DETAILED DESCRIPTION OF THE PREFERRED EMBODIMENTS

An embodiment of the present invention will be explained hereinafter with specific reference to the attached drawings.

Figure 1:
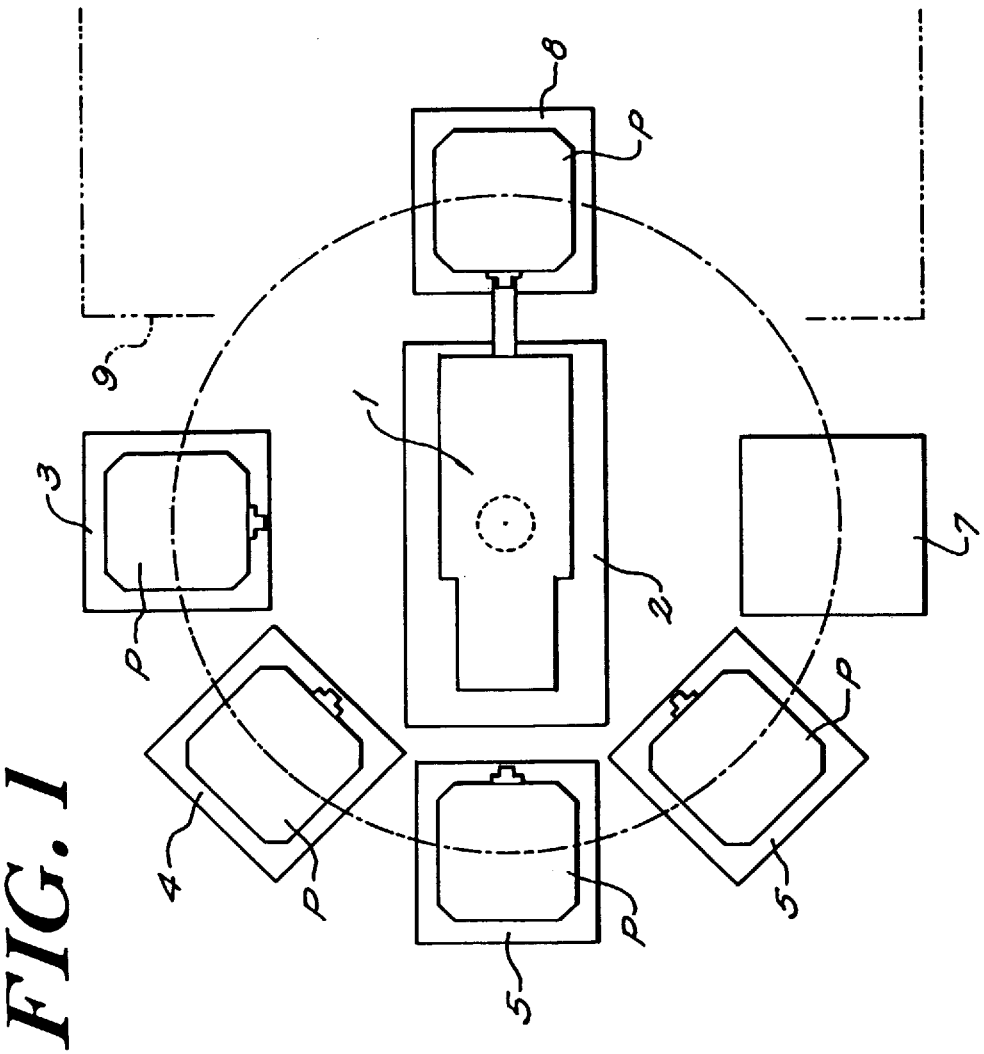
FIG. 1 is a schematic plan view of an automatic pallet changer or APC in accordance with the present invention.

FIG. 1 is a plan view of an automatic pallet changer or APC that can handle six pallets. The automatic pallet changer includes a bed 2 and a pallet transfer apparatus 1 which is rotatably mounted on the bed 2. Provided about the perimeter of the bed 2 in a circle are standby stations 3–6, a preparation station 7, and a changing station 8. In operation, the pallet transfer apparatus 1 moves pallets P among these stations 3–8 to substitute the pallet P on the changing station 8 for one on the table (not shown) of a machine tool 9.

FIGS. 2 to 5 show the pallet transfer apparatus 1 in further detail. With specific reference to FIGS. 2 and 3, the pallet transfer apparatus 1 includes a frame 11 with a U-shaped cross section. A rectangular base 12 is supported on linear guides 13 in the frame 11 in such a manner as to allow the base 12 to reciprocate along axis X along which pallets P are transferred. Provided below the frame 11 is a hydraulic cylinder 14 which serves as the means for driving the base 12. The hydraulic cylinder 14 has a piston rod 15 connected to the front end of the base 12 via a bracket 16.

Figure 2:
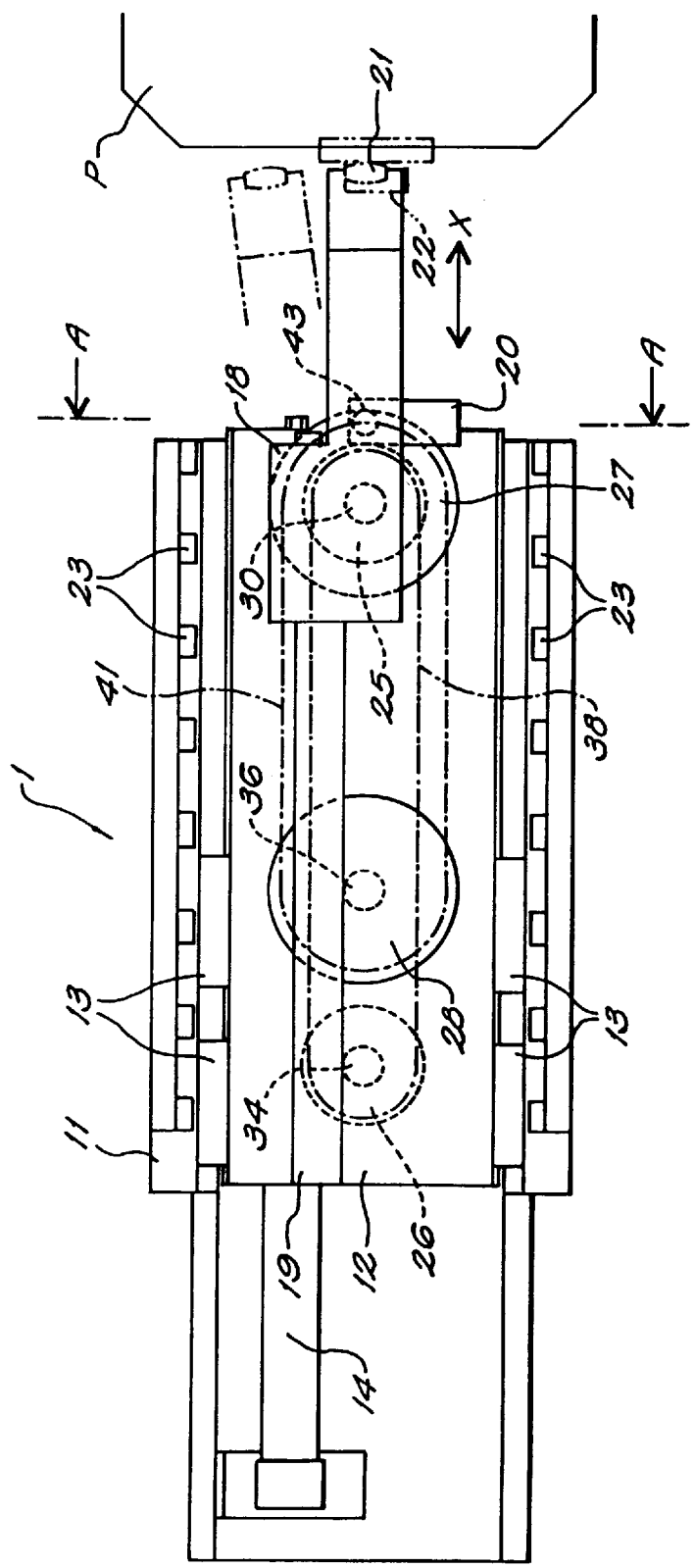
FIG. 2 is a plan view of a pallet transfer apparatus which constitutes part of the automatic pallet changer of FIG. 1, shown with its slider extended.
Figure 3:
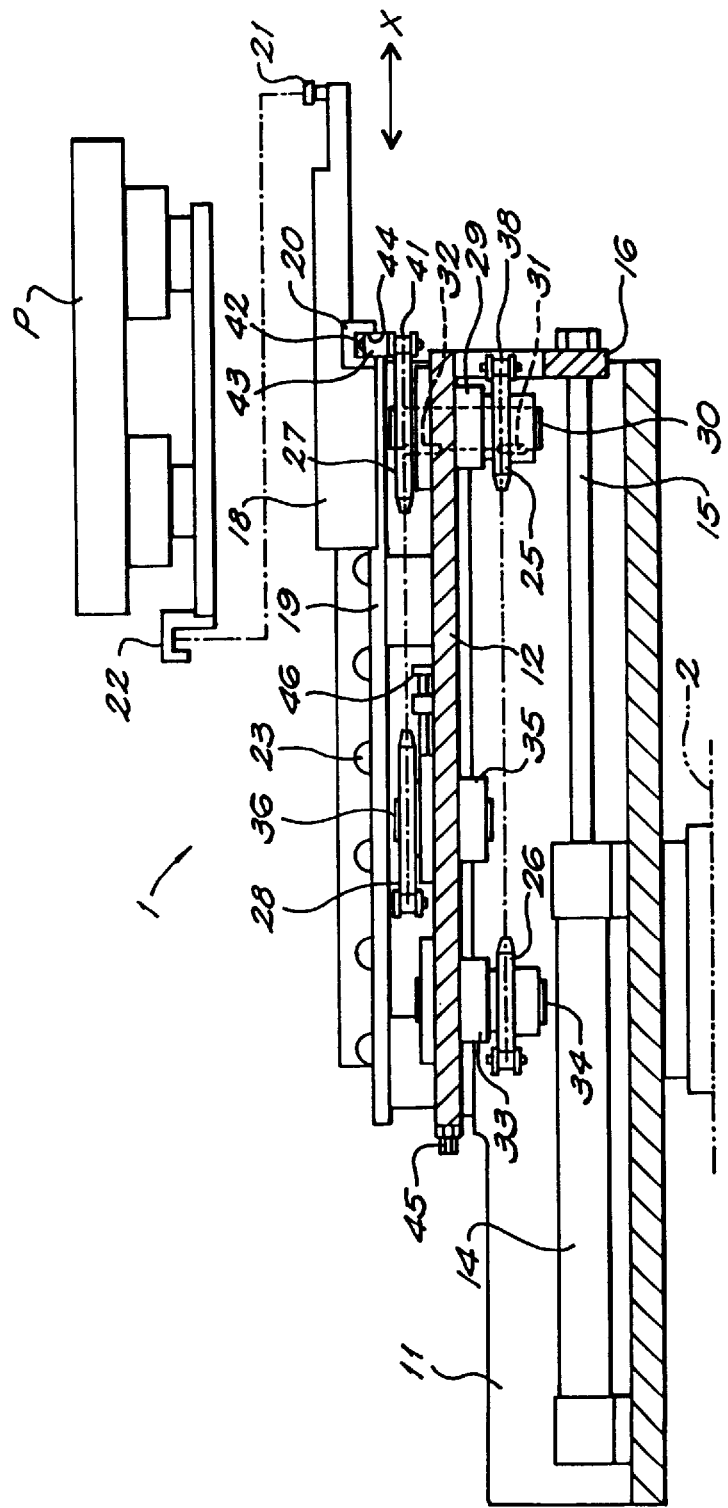
FIG. 3 is a partial cross sectional view of the pallet transfer apparatus shown in FIG. 2.
Figure 4:
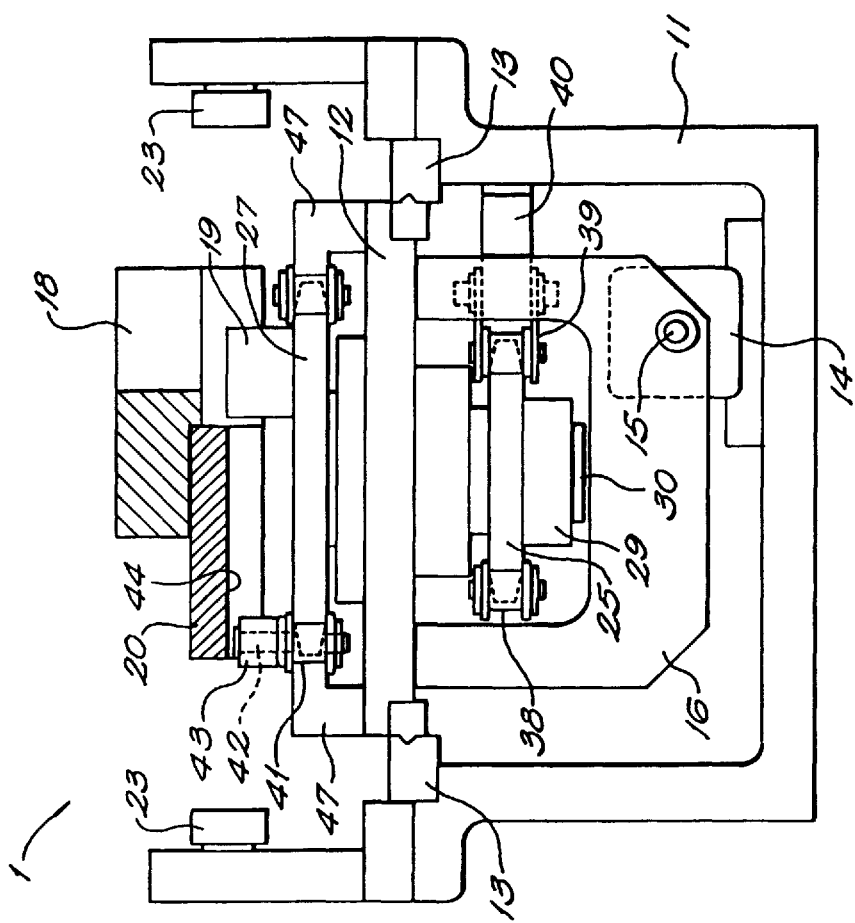
FIG. 4 is a cross sectional view of the pallet transfer apparatus taken on line A—A of FIG. 2.

With specific reference to FIG. 3, a slider 18 is mounted on a rail 19 above the base 12 in such a manner that it can slide on the pallet transfer axis X. A block 20, having an inverted U-shaped cross section, is provided in the intermediate part of the slider 18 with a portion thereof protruding orthogonal to axis X. In addition, the slider 18 is provided with a protruding member or catch 21 for disconnectably engaging a hook 22 of each pallet P by rotation of the frame 11. Pallets P are transferred between the stations and the frame 11. To linearly guide pallets P, the frame 11 has a plurality of rollers 23 mounted on either inner side thereof (see FIG. 2).

Referring to FIG. 3, front and rear small-diameter sprockets 25 and 26 are provided below the base 12 while front and rear large-diameter sprockets 27 and 28 are provided above the base 12. A first shaft 30 is supported by a bearing 29 near the front end of the base 12. The large-diameter sprocket 27 and the small-diameter sprocket 25 are supported on the upper and lower ends of the first shaft 30 by keys 32 and 31, respectively, so that the sprockets 27 and 25 can integrally rotate on the shaft 30. Additionally, a second shaft 34 is supported on the rear end of the base 12 by a bearing 33. The other small-diameter sprocket 26 is supported on the lower end of the second shaft 34. A third shaft 36 is also supported on the base 12 in the intermediate position of the base 12. Similarly, the other large-diameter sprocket 28 is supported on the upper end of the third shaft 36 by a bearing 35.

A first endless roller chain 38 is fitted over the small-diameter sprockets 25 and 26. The endless roller chain 38 includes a chain link 39 which is fixed to the frame 11 by means of a securing member 40 (see FIG. 4). Similarly, a second endless roller chain 41 is fitted over the large-diameter sprockets 27 and 28. The second endless roller chain 41 has a upwardly-projecting roller or engaging member 43 around an elongated pin 42. The engaging member 43 engages a recess 44 formed in the underside of the block 20. In addition, the base 12 includes adjusting bolts 45 and 46 for adjusting the tension of the roller chains 38 and 41, respectively (see FIG. 3). Also provided in the base 12 is a chain guide 47 for guiding the parallel portions of the second endless roller chain 41 (see FIG. 4).

Figure 6:
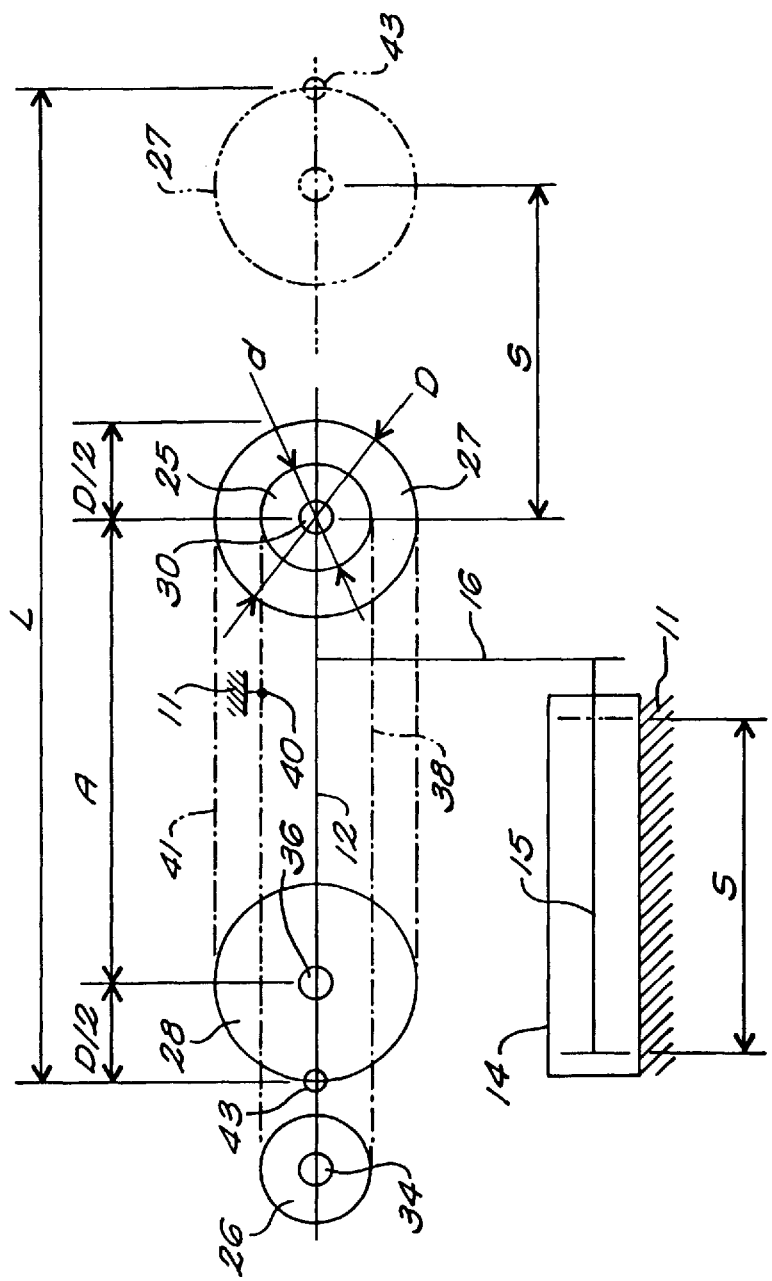
FIG. 6 is a schematic drawing that illustrates the operation of the pallet transfer apparatus shown in FIG. 1.

FIG. 6 is a schematic drawing that illustrates the operation of the pallet transfer apparatus I. In the figure, "L" indicates the pallet transfer distance; "A" the distance between the area of the large-diameter sprockets 27 and 28; "D" the pitch circle diameter of the large-diameter sprockets 27 and 28; "d" the pitch circle diameter of the small-diameter sprockets 25 and 26; and "S" the stroke of the hydraulic cylinder 14.

Figure 5:
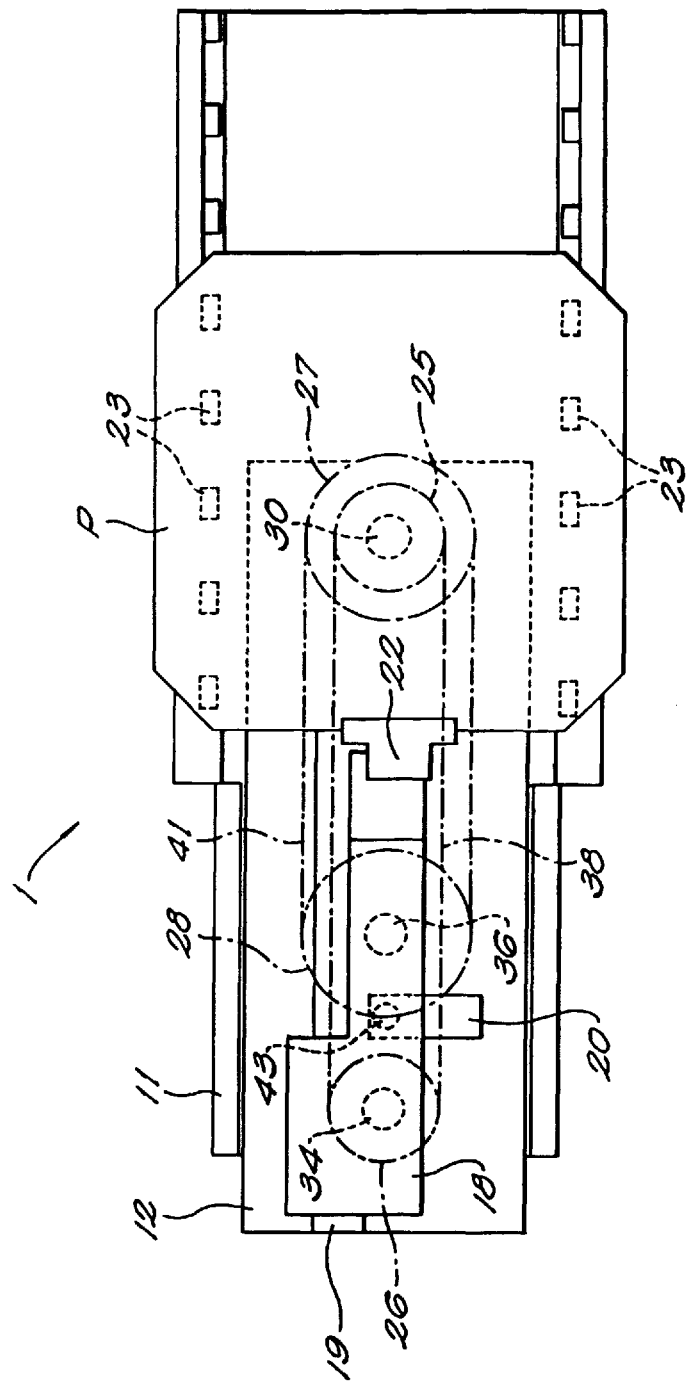
FIG. 5 is a plan view of the pallet transfer apparatus of FIG. 2 with the slider retracted.

In the operation of the pallet transfer apparatus 1 thus constructed, when the base 12 is driven by the hydraulic cylinder 14, the front small-diameter sprocket 25 and the front large-diameter sprocket 27 are integrally rotated since the first endless roller chain 38 is fixed to the frame 11. As the large-diameter sprocket 27 is rotated, the second endless roller chain 41 is rotated and the engaging member 43 is moved clockwise from the outermost point of the circumference of the large-diameter sprocket 27 as seen in FIG. 2 to the outermost point of the circumference of the large-diameter sprocket 28 as seen in FIG. 5, thus transferring pallet P by means of the slider 18 from the changing station 8 onto the base 12. When transferring pallet P from the base 12 onto the changing station 8, the engaging member 43 is moved counterclockwise from the position shown in FIG. 5 to the position shown in FIG. 2. Thus, as can be understood from the figures, the traveling route of the engaging member 43 and the chain link 39 (the portion of the first chain fixed to the frame) are located opposite each other across the line going through the rotational axes of the small-diameter sprockets and the large-diameter sprockets.

In accordance with the pallet transfer apparatus 1, the pitch circle diameter "D" of the large-diameter sprocket 27 is made larger than the pitch circle diameter "d" of the small-diameter sprocket 25, so that the rotational speed of the second roller chain 41 is multiplied by the factor D/d to achieve faster transfer of pallet P. Moreover, when the engaging member 43 moves along the circumferences of the large-diameter sprockets 27 and 28, the traveling speed of the engaging member 43 gradually decreases in a manner of a sine curve until the member reaches the outermost point of the circumference. This allows smooth acceleration and deceleration of the slider 18, thus avoiding exposing pallet P to extreme shock and vibration.

In accordance with the pallet transfer apparatus 1, the traveling distance of the engaging member 43 equals the cylinder stroke "S" multiplied by the factor "D/d" as follows:

$$(\pi D/2) + A = (D/d)S.$$

Thus, if the factor "D/d" is large, the engaging member 43 can be moved over a long distance even when the cylinder stroke S is relatively short. Furthermore, as the transfer distance "L" of pallet P can be expressed as:

$$L = D + A + S,$$

the transfer distance "L" can be made more than twice the cylinder stroke "S" if D+A is greater than S or (D+A)>S. Accordingly, a relatively short hydraulic cylinder 14 can be employed to minimize the pallet transfer apparatus 1 while achieving smooth, fast, and long-distance transfer of pallets P.

In the above-explained embodiment, the base and the slider are designed to move along the same axis (transfer axis X) with a pair of large-diameter sprockets and a pair of small-diameter sprockets both arranged in parallel to this axis. It should be understood that the present invention can be equally applicable to an configuration in which these components are disposed along somewhat different axes from one another.

As any number of further modifications, alterations, and changes are possible without departing from the scope or spirit of the essential characteristics of the present invention, it is to be understood that the above embodiment is only an illustration and not restrictive in any sense. The scope or spirit of the present invention is limited only by the terms of the appended claims.

What is claimed is:

1. A pallet transfer apparatus comprising:

a frame having an upper surface;

a base having upper and lower surfaces and reciprocably mounted on the frame;

a drive means for reciprocably driving the base between a first position and a second position;

first and second small-diameter sprockets rotatably mounted on the base;

first and second large-diameter sprockets rotatably mounted on the base, the first large-diameter sprocket and the first small-diameter sprocket being supported on a common axis so as to rotate integrally;

a first chain fitted over the small-diameter sprockets, a portion of the first chain being fixed to the frame;

a second chain fitted over the large-diameter sprockets;

a first engaging member protruding from a portion of the second chain;

a slider mounted on the base so as to reciprocate thereon;

a second engaging member, provided in the slider, for engaging the first engaging member; and a catch, provided in the slider, for engaging a pallet, whereby when the base is driven by the drive means, the first engaging member is moved via the first large-diameter and first small-diameter sprockets and the second chain so as to move the slider, thereby transferring the pallet.

2. A pallet transfer apparatus in accordance with claim 1, wherein the large-diameter and small-diameter sprockets are arranged parallel to the axis of reciprocation of the base.

3. A pallet transfer apparatus in accordance with claim 2, wherein the first engaging member is configured to move along a predetermined route when the base is driven by the drive means, the route of the engaging member and the portion of the first chain fixed to the frame being located opposite each other across the line going through the rotational axes of the small-diameter sprockets and the large-diameter sprockets.

4. A pallet transfer apparatus in accordance with claim 3, wherein the route has first and second terminals located at the two intersections of the line going through the rotational axes and the second chain.

5. A pallet transfer apparatus in accordance with claim 1, wherein the first engaging member is at the first terminal when the base is in the first position and at the second terminal when the base is in the second position.

6. A pallet transfer apparatus in accordance with claim 5, wherein the small-diameter sprockets are mounted on the lower surface of the base and the large-diameter sprockets are mounted on the upper surface of the base.

7. A pallet transfer apparatus in accordance with claim 6, wherein the drive means is a hydraulic cylinder mounted on the upper surface of the frame below the small-diameter sprockets.

8. A pallet transfer apparatus in accordance with claim 7, wherein the sum of the pitch circle diameter of either large-diameter sprocket and the distance between the axes of the large-diameter sprockets is greater than the stroke of the hydraulic cylinder.

9. A pallet transfer apparatus in accordance with claim 1, wherein the first engaging member is a roller and the second engaging member is a recess formed in an under surface of a block mounted on the slider.

* * * * *